United States Patent [19]

Abraham et al.

[11] Patent Number: 5,286,038

[45] Date of Patent: Feb. 15, 1994

[54] UNITIZED SEAL FOR HEAVY DUTY APPLICATION

[75] Inventors: Dennis J. Abraham, St. Charles; Linda Swetz, South Elgin, both of Ill.

[73] Assignee: SKF USA Inc., Elgin, Ill.

[21] Appl. No.: 950,198

[22] Filed: Sep. 24, 1992

[51] Int. Cl.$^5$ .............................. F16J 15/32
[52] U.S. Cl. ...................... 277/35; 277/153
[58] Field of Search ............. 277/35, 37, 152, 153, 277/237 A, DIG. 4

[56] References Cited

U.S. PATENT DOCUMENTS

| | | | |
|---|---|---|---|
| 4,185,838 | 12/1980 | Danner | 277/152 |
| 4,327,922 | 5/1982 | Walther | 277/37 |
| 4,345,770 | 8/1982 | Seeh | 277/152 |
| 4,432,557 | 2/1984 | Drucktenbungst | 277/35 |
| 5,096,207 | 3/1992 | Seeh et al. | 277/152 |
| 5,149,207 | 9/1992 | Vignoito | 277/37 |
| 5,211,406 | 5/1993 | Katzensteiner | 277/37 |

Primary Examiner—William A. Cuchlinski, Jr.
Assistant Examiner—D. DePumpo
Attorney, Agent, or Firm—Lockwood Alex Fitzgibbon & Cummings

[57] ABSTRACT

A unitized seal assembly for vehicle wheel hubs and the like. The seal assembly includes a primary seal component and a wear sleeve component. The primary seal component includes an elastomeric seal body with a primary sealing lip contacting a first portion of the wear sleeve component, an intermediate excluder lip facing another portion of the wear sleeve, and an outer, excluder seal portion with a cylindrical contact surface. The wear sleeve component has a casing with providing an interior cylindrical contact surface and an elastomeric exterior excluder lip with a seal band portion facing the cylindrical contact surface portion of the outer excluder seal. The seal body is reinforced by a stiffener that engages one part of the wheel hub and the wear sleeve casing is mounted on the other part of the hub.

6 Claims, 2 Drawing Sheets

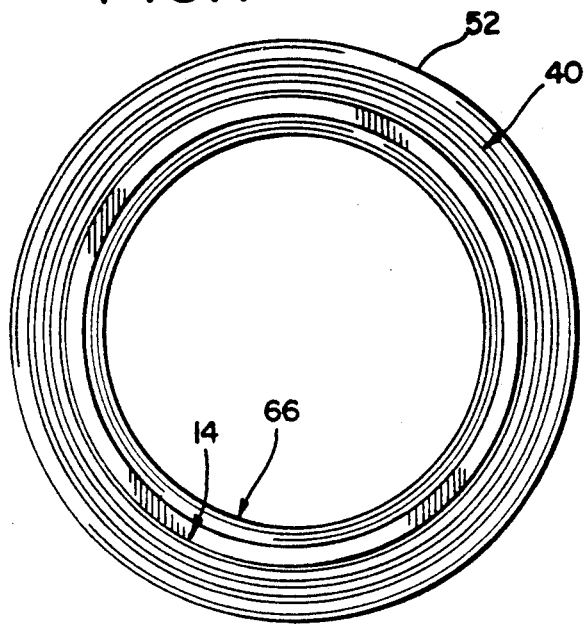
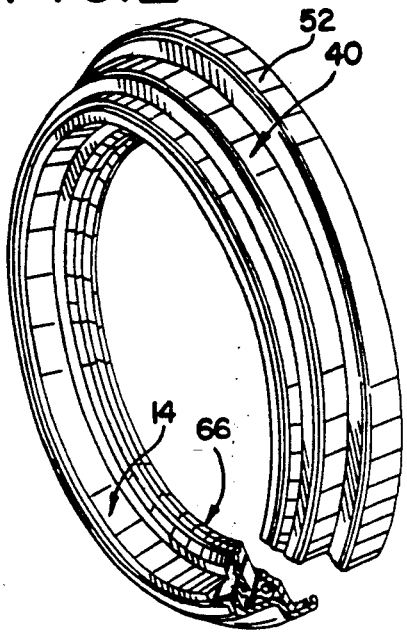
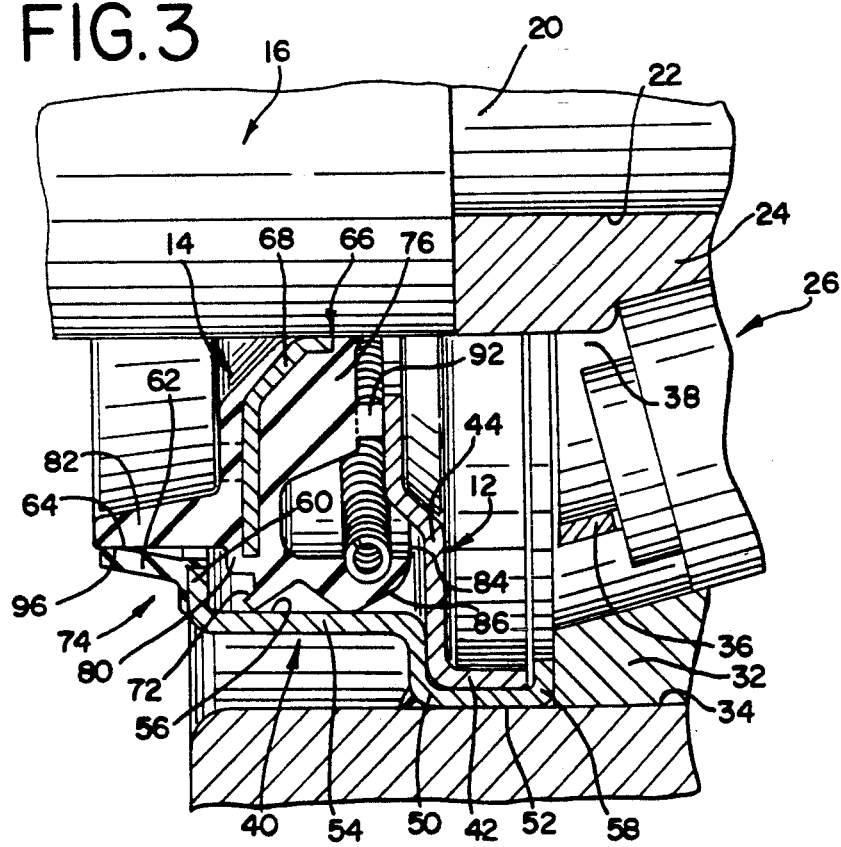

UNITIZED SEAL FOR HEAVY DUTY APPLICATION

BACKGROUND OF THE INVENTION

This invention relates to new and improved fluid seal assemblies. The seal assemblies of the present invention are particularly adapted for use as seals for bearings running in an oil bath, and may be installed in the wheel housing of tractors, trailers, semi-trailers, and the like.

Seal assemblies of the invention are provided with an elastomeric sealing element and a casing which provides the primary surface against which the elastomeric element bears to form the primary seal. The assembly of this invention includes, in addition, means which operate to exclude or minimize the ingress of dirt into the assembly to an extent that the effective lubricant action initially established is effectively maintained throughout operation, even under a conditions of an adverse nature.

In preferred embodiments of this invention, a wet or primary seal acts to retain lubricate within the bearing area, and an outer excluder seal and an inner excluder seal act to exclude dirt and other damaging foreign materials from the primary seal area.

Oil seal assemblies of the unitized type are well known and have enjoyed outstanding commercial success. Such oil seal assemblies are highly regarded for their dependability, even under the most adverse operating conditions. However, a finite probability still exists that dirt and other contaminants may penetrate the seal assembly and contaminate the primary seal, leading to eventual failure. When such a failure occurs, related components may be damaged, and contamination of the bearing assembly may also occur.

A failure resulting in leakage can cause brake shoes and/or drums to become oiled, in turn causing erratic stopping control and performance. Brake failure in heavy trucks or other vehicles can create great risks to persons and property. In addition, lubricant leakage can cause dry running and lubricant failure. Eve if the bearings do not run dry, reduced oil levels can cause undesirably increased operating temperatures. Seal failures can therefore cause failure of or damage to adjacent or associated parts of the vehicle.

In most cases, the costs associated with such a failure are much higher than the cost of the oil seal assembly itself. As such, any improvement which reduces the likelihood of failure or shortened life is highly desirable. Seals made in accordance with the present invention provide a substantial improvement over certain heretofore available oil seals of this general type because of a great potential increase in the operating life and other advantages can be achieved.

It is one of the objects of the present invention to provide a new and improved seal assembly having a prolonged operating life.

It is another object of the present invention to provide a new and improved unitized oil bath seal assembly which provides prolonged life for the inner excluder seal and for the primary seal.

It is a further object of the invention to provide an unitized oil bath seal assembly which combines an elastomeric sealing element which is fixed to and in fluid-tight engagement with a first of a pair of movable parts, and a casing element in fixed, fluid-tight engagement with a second of said pair of parts, wherein one element has a sealing surface engaging said elastomeric element, wherein an elastomeric lip is bonded to a portion of one casing element, and in which the sealing element includes an axially extending collar which rotatably engages a portion of an exterior excluder lip body bonded to the casing element.

It is a further object of the invention to provide a unitized oil bath seal assembly which includes first and second casing units, one of which provides a running surface for an elastomeric seal lip and the other of which is bonded to an elastomeric sealing lip and wherein the parts are constructed and arranged so that each of the components includes a generally axially extending collar or like element, with the two collar elements having mutually opposed surfaces in facing relation and molded, cut or otherwise formed to a size such that, upon initial installation, there is sealing contact between the opposed surfaces.

Another object of the invention is to provide a unitized oil bath seal arrangement wherein the elastomeric seal body includes a primary lip portion, an excluder lip portion, and a collar-like element having a circumferentially extending radially outwardly directed area thereof adapted for sealing contact with an opposed circumferentially radially inwardly directed sealing surface on a lip or collar element extending axially outwardly from the casing unit with which the primary and inner excluder lips make sealing contact.

A still further object of the invention is to provide an oil bath type seal for oil hub or like applications wherein two excluder seals are provided, one being a rubber-to-rubber exterior excluder seal and wherein the other is a rubber-to-metal intermediate excluder seal formed between the outer seal and the primary seal.

Another object of the invention is to provide a composite oil bath type seal of unitized construction which may be made at low cost.

Other objects and advantages, and the manner of their attainment will become more clearly apparent from the following detailed description of the preferred embodiments of the invention, and by reference to the drawings, in which like reference numerals indicate corresponding parts throughout.

BRIEF DESCRIPTION OF THE DRAWINGS

FIG. 1 is an end elevational view of one form of a unitized oil bath seal embodying the invention;

FIG. 2 is a perspective view of the unitized oil bath seal of FIG. 1, showing a portion thereof broken away;

FIG. 3 is a greatly enlarged, fragmentary vertical sectional view of the embodiment of the unitized oil bath seal shown in FIG. 1, shown in association with a vehicle wheel bearing assembly.

DESCRIPTION OF THE PREFERRED EMBODIMENTS OF THE INVENTION

Figure 4:
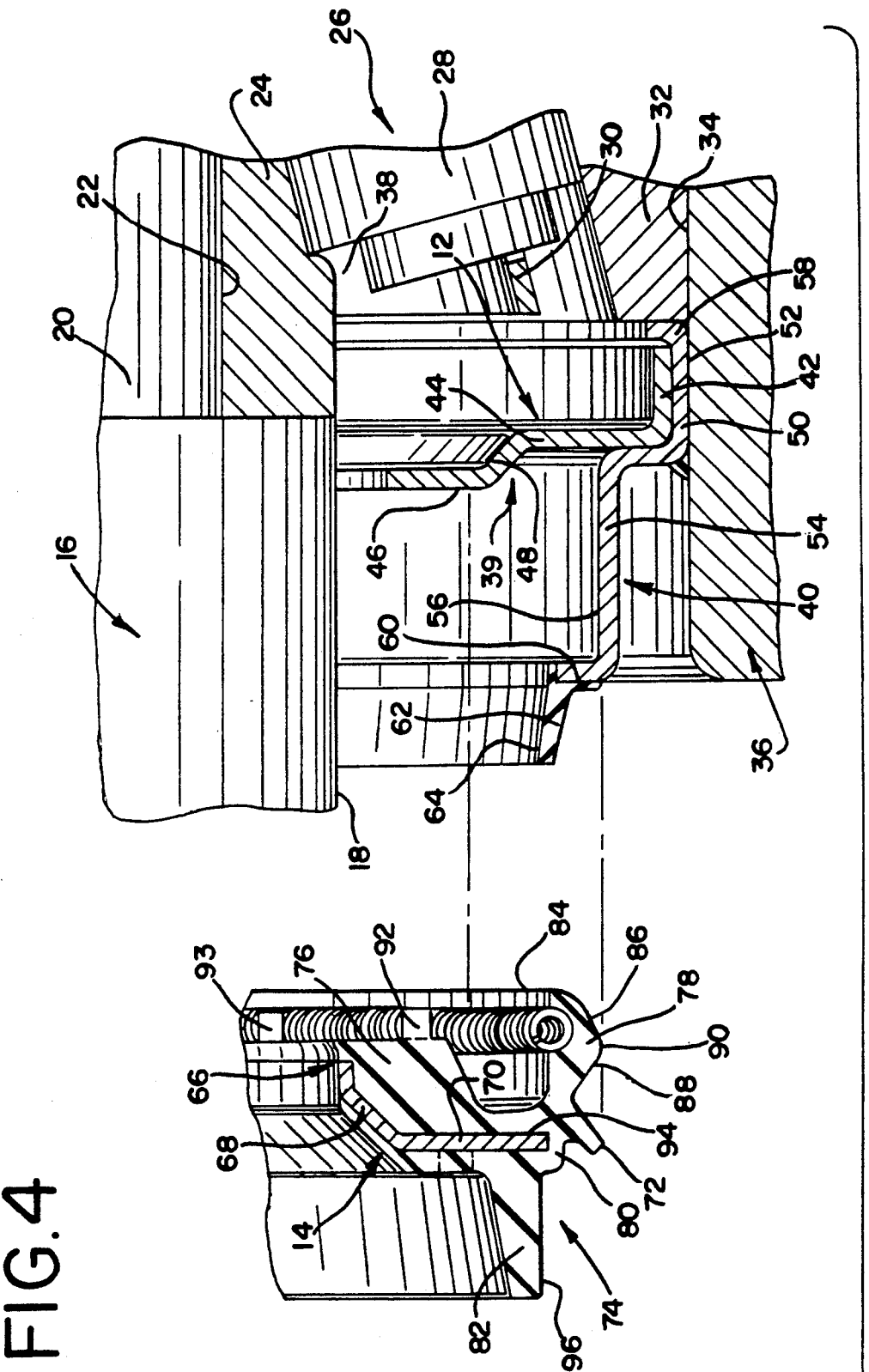
FIG. 4 is a view of the seal of FIG. 3, showing the same seal but with two of the principal elements in exploded relation.

While the principles of the invention may be applied to different forms of seal units, a detailed description will be given of one form of seal unit wherein the application is a seal for the wheel and hub of a large vehicle, arranged such that the radially outer casing and "wear sleeve" portion of the seal is adapted for rotation and the inner part, which includes the primary and excluder lip bodies, is a fixed or non-rotary element.

Referring now to the drawings in greater detail, FIGS. 1 and 2 show the seal assembly of the invention to be embodied in a composite seal assembly generally designated 10 and shown to have a number of important elements arranged in generally concentric relation. The seal of the invention is a so-called unitized seal, that is, one wherein both relatively movable parts of the assembly are manufactured and pre-assembled before being placed in a position of use in the application. In such seals, all of the relative motion, and hence, the primary sealing, takes place relative to the parts comprising the components from which the seal is made. Each component is then fixed in a static or non-rotary relation to associated parts.

In keeping with the present invention, the seal 10 of the invention includes two major elements, a wear sleeve unit generally designated 12 and a sealing assembly generally designated 14. The machine parts with which the seal 10 is associated in use rotate relative to each other about a common axial extending center line. Typically, these elements include a shaft or spindle generally designated 16 and shown to have circumferentially extending cylindrical outer surface 18 which, in most applications, is fixed or non-rotary.

In the embodiment shown, the shaft or spindle 16 includes a reduced diameter section 20 with an outer surface 22 against which the inner race 24 of a bearing assembly generally designated 26 is located. As is customary, plural bearing rollers 28 are located by a cage 30 and ride on the outer surface of the inner race 24 and on the inner surface of the outer bearing race 32. The outer race is secured, usually by a press fit, against the inner surface 34 of a rotary element generally designated 36. In most applications, the unit 36 is a part of a wheel hub. In the drawings shown, the lubricated cavity or "oil side" space 38 is to the right of the seal assembly 10 as shown in the drawings.

Referring again to FIGS. 3 and 4 of the drawings, it is shown that the wear sleeve 12 includes an inner, unitizing casing generally designated 39 and an outer casing generally designated 40. The inner casing includes an axial positioning flange 42, a radially outer flange 44, a radially inner, spacer contact flange 46 and an offset portion 48 (FIG. 4). As will appear, the inner casing 39 is a unitizing casing, the purpose of which is to locate other portions of the seal against axial movement and permit oil to reach the primary seal surfaces which run in, or in contact with, a bath of oil from the sealed cavity 38.

Referring now to the outer casing 40, this unit is shown to include a major diameter flange 50 having its exterior surface 52 serving as a mounting surface that contacts the inner surface 34 of the wheel hub 36. An important element of the outer casing 40 is the minor diameter flange 54, the inner surface 56 of which serves as the seal contact surface. This is also sometimes simply referred to in the art as the "wear sleeve surface".

In a preferred form of the invention, an axially inner curl 58 is provided on the major diameter flange 50 to lock the inner casing 39 in place; a parallel, axially outer curl 60 is formed at the axially outer end of the minor diameter or wear sleeve flange 54. In this connection, here and elsewhere in the specification and claims, the expression "axially inner", or words of like import mean towards the oil side or sealed region of the assembly; "axially outer" means toward the air side or exterior of the sealed region.

Referring again to FIGS. 3 and 4, an important feature of the present invention is the formation of a flexible, exterior, excluder lip body 62 on the curl 60. This body 62 includes a circumferentially extending, radially inwardly directed sealing surface 64. As shown in FIG. 4, which is an exploded view, the surface 64 is somewhat inclined or frustoconical; this is the way it appears in its as-molded or unstressed condition. However, as will appear, it will normally be deflected somewhat radially outwardly in use to an extent such that the surface 64 is a nearly axial surface.

Referring now to the other principal element of the inventive seal 10, the seal assembly generally designated 14 is shown to include a contoured metal stiffener element generally designated 66 and shown to include a radially innermost, circumferential locating flange 69, adapted to be press fit over the surface 18 of the spindle 16. The stiffener 66 also includes an intermediate, tapered section 68, and an outer radial body portion 70.

The preferred form of seal unit 14 includes a unitary elastomeric body generally designated 74, which is shown in FIG. 4 to include a spacer body portion 76, a primary seal lip body 78, an intermediate or inner excluder lip body 80, and a generally cylindrical outer excluder lip body in the form of a collar 82. The inner or primary lip 78 is conventional and includes a garter spring 84 received in a groove formed for the purpose of applying a radially outwardly directed compressive load to the seal lip itself. The primary seal body 78 includes an oil side surface 86 and an air side surface 88, which are frustoconical and meet along a generally circular locus to form a primary seal band 90 of intended contact with the mating surface 56 on the wear sleeve element 12. The spacer body 76 is of annular form and includes spaced apart contact formations or chaplets 92, the end faces 93 of which contact an opposed surface of the radially inner flange 46 on the unitizing casing 39.

In addition, the elastomeric body 74 includes inner and outer frustoconical surfaces similar to those just described that meet to form an excluder seal band 94, which also contacts the wear sleeve surface 56 in use. As is known to those skilled in the art, the primary seal band 90 runs fully lubricated in or in contact with a bath of oil. The combined effects of its as-molded size and the garter spring 84 urge it snugly against the wear sleeve surface 56 to prevent oil leakage. The seal band 94 of the excluder lip body 80 does not contact the wear sleeve with as much force and often runs in contact with a mere film of oil or no lubrication; its purpose is to exclude contaminants such as dust, grit, or the like from reaching and damaging the seal band area. An enclosed area 100 lies between the seal bands 90, 94 and it is possible to fill the space 100 with an entrapping material such as grease or other lubricant if desired, although this is not necessary in keeping with the invention.

As shown in FIG. 3, when the parts just identified are assembled, the result is the provision of a composite seal assembly that includes a rubber-to-rubber exterior seal generally designated 99 and shown to be formed of a relatively stiff elastomeric collar and a flexible sealing lip, both of which extend well beyond the curl 60 on the end of the outer casing 40.

Tests have shown that such a seal is extremely effective and excluding contaminants, including, in some cases, water or other fluids which are desired to be kept from the primary seal band. The intermediate seal or inner excluder lip can function more effectively in this way and perform its intended function of protecting the primary lip.

According to the present invention, the prior art style excluder seal becomes an intermediate excluder seal and an additional, exterior excluder seal is provided which is formed of rubber surfaces contacting each other. In this connection, it will be noted that the exterior seal body 82 is of generally cylindrical or collar-like configuration, is thick enough to be relatively stiff and includes an outer, seal forming surface 96 that extends circumferentially about the collar 82 and which is preferably of about the same diameter throughout its axial extent.

While the reasons for the success of the present invention are not known with certainty and while it is not desired to limit the scope of the invention to any particular mechanism or theory of operation, it is believed that the provision of the additional seal and its location outside the stamping, together with its construction, which permits a good mixture of accommodation for radial and axial runout or movement in use is very advantageous. The exterior location provides cooling and serves as a rotary "slinger" or centrifugal excluder effect.

While the embodiment described has shown certain portions fixed and others as being relatively moveable, it will be understood that certain of the parts of the invention may be inverted or reversed in use without change of essential function.

It will thus be seen that the present invention provides a novel unitized seal assembly having a number of novel advantages and characteristics, including those referred to specifically herein and others which are inherent in the invention. A preferred form of seal unit of the invention having been described in detail, by way of example, it is anticipated that the variations in the described form of construction may occur to those skilled in the art, and that such variations may be made without departing from the spirit of the invention or the scope of the appended claims.

I claim:

1. A unitized seal assembly for heavy duty use in association with first and second, relatively movable machine elements, said seal comprising, in combination, a primary seal component and a wear sleeve component, said primary seal component including a stiffener element and an elastomeric seal body, the radially inner portion of said stiffener element being sized for snug engagement with said first machine element, said seal body being bonded to said stiffener element and including a pair of frustoconical surfaces meeting along a generally circular locus to form a primary seal lip intended to contact an opposed, first surface portion of said wear sleeve component, said seal body also including an intermediate excluder lip formed by the convergence of two surfaces meeting along a generally circular or cylindrical locus to form an excluder lip in facing relation to a second opposed facing surface portion of said wear sleeve, said elastomeric body further including an exterior excluder seal portion extending axially outwardly of said primary lip and said intermediate excluder lip portions of said seal, said exterior excluder seal portion including a generally axially extending cylindrical contact surface for engagement with an exterior excluder lip, said wear sleeve component including a casing wall with an exterior cylindrical mounting surface for fluid-tight association with said second movable machine element, an interior cylindrical contact surface having first and second portions sized for sealing contact with said primary seal lip and said intermediate excluder lip, respectively, and an axially outer end portion, said wear sleeve component also including an elastomeric exterior excluder lip bonded to an extending outwardly from said axially outer end portion of said casing wall, said exterior excluder lip having a radially inwardly facing seal band portion adapted to contact said cylindrical contact surface on said exterior excluder seal portion, whereby when assembled, said seal assembly includes an exterior, elastomer-to-elastomer excluder seal, an intermediate excluder seal and a primary seal formed by contact between said primary seal lip and said casing contact surface.

2. A unitized seal assembly as defined in claim 1 wherein said casing wall has a major diameter and a minor diameter, with said exterior cylindrical mounting surface forming said major diameter and with said interior cylindrical contact surfaces being formed on a portion of said wall minor diameter.

3. A unitized seal assembly as defined in claim 1 wherein said seal assembly further includes, as a unitizing element, an additional casing element, said additional casing element being fixedly positioned relative to a portion of said casing wall, said additional casing element including radially inner and outer, generally radially extending wall portions and a shoulder portion offsetting said radially extending wall portion from each other.

4. A unitized seal assembly as defined in claim 3 wherein said elastomeric seal body includes plural, spaced apart, contact formations extending axially inwardly from the remainder of said seal body having their end portions in use contacting an opposed surface of said radially inner wall portion on said additional casing element.

5. A unitized seal assembly as defined in claim 1 wherein said portion of said casing wall from which said exterior excluder lip element extends comprises a radial flange formed on said axially outer portion of said wear sleeve component.

6. A seal assembly as defined in claim 1 wherein the radially inner portion of said stiffener element includes an axially extending, generally cylindrical flange having a surface adapted to contact a shaft with which said seal is associated in use in snug mechanical positioning engagement.

* * * * *